United States Patent [19]

Tripp et al.

[11] Patent Number: 4,557,463

[45] Date of Patent: Dec. 10, 1985

[54] EROSION RESISTANT SOFT SEATED VALVE TRIM

[75] Inventors: Dale S. Tripp, Erie; Timothy E. Kunkle, McKean, both of Pa.

[73] Assignee: White Consolidated Industries, Inc., Cleveland, Ohio

[21] Appl. No.: 599,252

[22] Filed: Apr. 11, 1984

[51] Int. Cl.⁴ ............................................. F16K 11/20
[52] U.S. Cl. ..................................... 251/210; 251/282; 137/630.19; 137/630.22
[58] Field of Search ............................. 251/210, 282; 137/630.22, 630.19

[56] References Cited

U.S. PATENT DOCUMENTS

| | | | |
|---|---|---|---|
| Re. 31,417 | 10/1983 | Huber | 251/210 |
| 676,580 | 6/1901 | French | 251/334 |
| 1,449,876 | 3/1923 | Williams | 123/88.8 |
| 1,671,139 | 5/1928 | Wilson | 251/334 |
| 1,847,385 | 3/1932 | Dengler | 251/86 |
| 2,413,869 | 1/1947 | Hamer | 251/127 |
| 2,414,908 | 1/1947 | Smith | 251/27 |
| 2,830,620 | 4/1958 | Shuptrine | 251/210 |
| 2,857,131 | 10/1958 | Cole | 251/210 |
| 2,886,283 | 5/1959 | Natho | 251/175 |
| 2,918,078 | 12/1959 | Cummings | 137/332 |
| 3,085,590 | 4/1963 | McIlhenny | 251/210 |
| 3,150,817 | 9/1964 | Jepsen | 251/210 |
| 3,185,438 | 5/1965 | Smirra | 251/334 |
| 3,384,107 | 5/1968 | Kuskevics et al. | 137/329.05 |
| 3,433,250 | 3/1969 | Hagihara | 137/469 |
| 3,583,426 | 6/1971 | Feres | 251/174 |
| 3,601,157 | 8/1971 | Milleville | 137/630.22 |
| 3,892,384 | 7/1975 | Myers | 251/282 |
| 3,945,390 | 3/1976 | Huber | 251/333 |
| 3,971,415 | 7/1976 | Foller | 137/630.19 |
| 4,044,993 | 8/1977 | Wheeler | 251/158 |
| 4,105,187 | 8/1978 | Huber | 251/334 |
| 4,254,792 | 3/1981 | Schadel | 251/334 |
| 4,341,370 | 7/1982 | Banks | 251/282 |
| 4,460,014 | 7/1984 | Mases et al. | 251/210 |

Primary Examiner—James C. Yeung
Attorney, Agent, or Firm—Mandeville & Schweitzer

[57] ABSTRACT

The disclosure is related to a high pressure fluid control valve including a valve seat made from a resilient, deformable material and a main valve plug which is matable with the resilient, deformable valve seat. A selectively, axially displaceable valve stem is associated with the valve plug whereby a contact load placed upon the valve plug by the valve stem will cause the valve plug to be become imbedded within the deformable material comprising the valve seat when the valve is closed and thereby conform the deformable seat precisely to the contour and configuration of those portions of the valve plug which mate with the valve seat. In this manner, a precise zero-leakage mating is obtained each and every time the plug is mated with the seat. In accordance with the invention, an auxiliary throttle plug is associated with the main valve plug and is arranged to mate with a second, metal valve seat which is arranged in an area removed from the resilient, deformable valve seat. The axial movements of each of the valve plug and the throttle plug are coordinated in a manner whereby the primary throttling areas for the fluid flow, particularly during valve opening and valve closing operations are displaced to portions of the valve structure which are remote from the resilient, deformable valve seat.

2 Claims, 5 Drawing Figures

EROSION RESISTANT SOFT SEATED VALVE TRIM

BACKGROUND AND SUMMARY OF THE INVENTION

The present invention is directed to a high pressure control valve and in particular to a new and improved soft seat design.

One of the principal functions of a high pressure control valve is to provide a complete and leak-proof shut off of fluid flow when the valve is in the closed position. Typically, this is accomplished by mating an axially movable valve plug with a stationary valve seat, whereby the valve plug and seat isolate the high pressure fluid from the fluid outlet portions of the control valve. In most conventional valve designs, the valve seat is made from metal to provide a so-called "hard-seat" arrangement. The valve plug is also made from metal and therefore the fluid flow shut off is achieved by a metal-to-metal contact between the valve plug and the valve seat. In such a hard-seat arrangement, it is critical that the valve plug and seat precisely mate with one another to completely shut off and isolate the high pressure fluid from the valve outlet. The manufacture of each of the valve plug and seat from metal is advantageous in a high pressure application in that the metal components are fairly resistant to the deleterious effects of the high pressure fluid flow including cavitation and other eroding effects caused by the high pressure fluid flow and the generally high pressure drops experienced by the fluid flow as it passes through the valve structure. Nevertheless, it is widely recognized in the valve industry that it is virtually impossible to obtain a zero-leakage mating between the valve plug and seat when utilizing a hard metal-to-metal contact arrangement.

Moreover, in time, the high pressure fluid flow through the valve causes wear and tear on the metal components. In addition, impurities found within the fluid flow may become trapped between the valve plug and valve seat during valve shut off to thereby pit and otherwise damage the valve plug and/or valve seat. It should be understood that the normal wear and tear and possible damage to the valve components caused by impurities found within the fluid flow will not occur uniformly throughout the mating portions of the metal valve plug and metal seat. Thus, in time, the mating relationship between the valve plug and seat will become less precise resulting in a greater amount of fluid leakage when the valve is in the shut off position. Accordingly, the valve will gradually become less effective as a means to completely interrupt fluid flow. In certain severe duty valve applications, such as pump recirculation, complete fluid isolation is critical and the gradual and uneven erosion of the metal components of the valve make such hard seat designs somewhat less than desirable in the critical, severe duty applications.

In order to overcome the shortcomings of the hard-seat design, those skilled in the art have proposed the use of a so-called "soft seat" design. In such a valve arrangement, the seat is made from a resilient, deformable material, whereby the contact load placed upon the valve plug will cause the valve plug to become imbedded within the soft seat and thereby conform the soft, deformable seat precisely to the contour and configuration of the valve plug mating portions. In this manner, the soft seat provides a precise mating each and every time the plug is mated with the seat. Moreover, the high degree of seat conformance achieved with a soft seat design is obtainable with stem forces that are far lower than the stem forces required to achieve a good leak-tight shut off in a metal-to-metal arrangement. Accordingly, a zero leakage valve shut off may be obtained far more readily and easily in a soft seat design than in a hard seat design. However, a problem associated with the soft seat arrangement is the rather rapid erosion of the resilient deformable material utilized to manufacture the soft seat. Typically, as the valve plug is lifted from the valve seat, a very high pressure fluid flow is immediately throttled directly over the valve seat as fluid flow is permitted to resume between the valve plug and the valve seat. It is this throttling effect which generally erodes the soft seat valve material. As a consequence of the relatively rapid wear down of the soft valve seat, such soft seat valves require a more than desirable amount of down time in order to rebuild or replace the soft seat. Indeed, the rapid erosion may preclude the use of a soft seat in certain high pressure applications.

It is a primary objective of the present invention to provide a soft seat valve with additional novel means to displace the deleterious throttling effects of the fluid flow away from the soft valve seat. Generally, the invention comprises a high pressure control valve including a soft seat made from a resilient, deformable material. In accordance with a significant feature of the invention, the control valve is provided with a main valve plug which is matable with the soft seat and an additional, auxiliary throttle plug which is coaxial with and axially movable relative to the main valve plug. The throttle plug is arranged to mate with a second metal valve seat which is concentric with and arranged in an area removed from the soft valve seat. In accordance with the invention, the axial movements of each of the main valve plug and the throttle plug are coordinated in a manner whereby the primary throttling areas for the fluid flow are displaced to portions of the valve structure which are remote from the soft seat, as will appear.

As contemplated by the preferred embodiment of the invention, the main plug comprises a generally cylindrical, at least partially hollow plug having a valve seat-engaging rim which circumscribes the at least partially hollow portion of the plug. The throttle plug is axially received within the hollow portion of the main plug and is associated with a throttle plug retaining means arranged to retain the throttle plug within the main plug hollow portion while accommodating a limited, axial movement of the throttle plug relative to the main plug. Moreover, a biasing means urges the throttle plug away from the main plug whereby one end of the throttle plug ordinarily protrudes from the hollow portion of the main plug beyond the valve seat-engaging rim. When in the closed position, the rim of the main plug contacts the soft seat under pressure from a valve stem to form a leak-tight, fully conformed mating between the rim and the deformable, resilient seat. In this manner, a highly effective fluid flow shut off is achieved. In addition, the protruding end of the throttle plug will be in a mating relation with the second, metal valve seat.

Pursuant to the invention, the valve is operated such that during the initial opening of the valve, the rim of the main plug is displaced from the soft seat while unbalanced pressure effects, as will be more fully described below, and the biasing means act to retain the throttle plug in contact with the second, metal seat. At this point, the only fluid flow will be leakage through the metal-to-metal contact of the throttle plug and seat and around various piston rings arranged between the main plug and the throttle plug. However, as should be understood, the leakage is primarily throttled across either the metal seat or the piston rings and, to advantage, these components may be made from erosion resistant, stainless steel.

As the valve continues to open, the main plug will continue to lift from the soft seat. Eventually, the retaining means will cause the throttle plug to move in tandem with the main plug to thereby displace the throttle plug away from the second, metal seat. At this point, the fluid will begin to flow freely through the valve and the primary fluid throttling area will be across the second, metal seat. Inasmuch as the second, metal seat is spaced from the soft seat, the novel main plug-throttle plug arrangement of the invention provides the advantages of a soft seat valve shut off in a manner whereby the primary throttling of the fluid flow is caused to occur at areas of the valve structure which are remote from the soft seat.

In accordance with another feature of the invention, the metal seat is arranged upstream from the soft seat and a fluid flow restrictor means is arranged downstream from the soft seat. Accordingly, the fluid flow restrictor means will serve as an additional principal throttling area to further reduce erosive fluid forces at the soft seat. Moreover, when the valve is in the fully opened position, all of the throttling will be across the fluid flow restrictor means.

Thus, the present invention provides a control valve with the highly advantageous zero leakage shut off obtainable by utilizing a soft seat while, at the same time, greatly reducing the erosive effects of the fluid flow upon the soft seat by displacing the principal throttling areas for the fluid flow away from the soft seat. The rim of the main plug will, in each valve closing operation, fully conform the deformable, resilient seat to its exact contour and configuration. The throttle plug will operate, in both valve opening and valve closing operations, to provide a primary throttling area for the fluid flow comprising an erosion resistant surface that is spaced from the soft seat. The invention, therefore, teaches an effective and straight forward means for shielding the soft seat from harmful fluid flow effects within a valve structure arranged to shut off high pressure fluid flow by the exact mating between the main plug and the soft seat.

For a better understanding of the above and other features and advantages of the invention, reference should be made to the following detailed description of a preferred embodiment of the invention and to the accompanying drawings.

DETAILED DESCRIPTION OF A PREFERRED EMBODIMENT OF THE INVENTION

Figure 3:
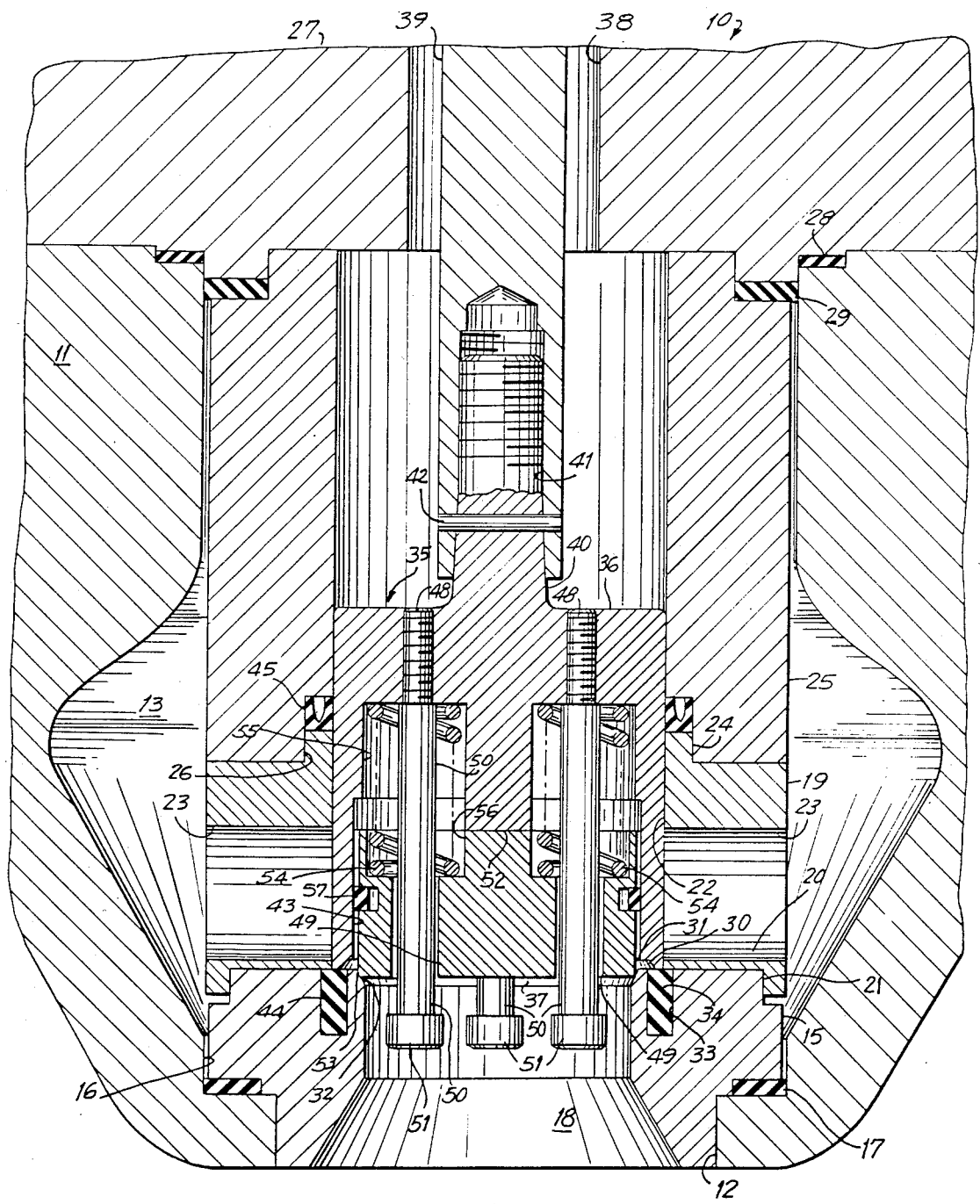
FIG. 3 is a side cross-sectional view of a control valve according to the present invention illustrating the valve in the fully closed position and taken generally along line 3—3 of FIG. 1.

Referring now to the drawings, and initially to FIG. 3, there is illustrated a high pressure control valve generally indicated by the reference numeral 10. The valve 10 comprises a valve body 11 including a fluid inlet portion 12, an internal web portion 13 and a fluid outlet portion 14 (see FIG. 4). A valve seat ring 15 is seated against a generally annular recess 16 formed within the internal web portion 13 at the area thereof adjacent the upper portions of the fluid inlet 12. As clearly illustrated, the valve seat ring 15 is arranged to extend to within the confines of the fluid inlet 12 and a trim gasket 17 is arranged between the annular recess 16 and the valve seat ring 15 to provide a leak tight seal around the valve seat ring 15 thereby preventing fluid leakage from the fluid inlet 12 around the exterior of the valve seat ring 15 and into the internal web portion 13. The valve seat ring 15 is formed to include a partially tapered, partially straight walled fluid flow path 18 extending completely therethrough whereby fluid is free to flow from the fluid inlet 12 through the flow path 18 and toward the internal web portion 13. A fluid flow restrictor means, in the form of a generally cylindrical valve cage 19, is provided with a generally annular recess 20 formed at the lower end thereof. The recess 20 is received over a section of reduced diameter 21 formed at the upper end of the valve seat ring 15 whereby the cage trim 19 is mounted upon and in a coaxial relationship with the valve seat ring 15.

To advantage, the valve trim cage 19 includes a generally cylindrical flow path 22 extending axially through the cage 19 and generally overlying and forming a continuous flow path with the fluid passage 18 of the valve seat ring 15. A series of radially extending flow paths 23 are formed through the walls of the trim cage 19 and extend from the flow path 22 to the outer surface of the trim cage 19. The flow paths 23 will act to subdivide any fluid flow through the flow path 22 into a plurality of substreams and, therefore, form a partial restriction to fluid flow. Accordingly, the trim cage 19 provides a primary throttling area for fluid flow, particularly when the valve 10 is in the fully opened position, as will appear.

In order to secure the trim cage 19 in its mounted position upon the valve seat ring 15, an upwardly extending rim 24, formed at the upper portion of the trim cage 15, is received within an annular recess 26 provided near the lower end of the hollow interior of a hollow cylindrical cage spacer 25. The cage spacer 25 extends upwardly through the web portion 13 of the valve body 11 to a snug mating relation with a valve bonnet 27 which is secured to the valve body 11 in a well known manner (not specifically illustrated). A body-bonnet gasket 28 is arranged between the bonnet 27 and the valve body 11 and an upper trim gasket 29 is suitably secured between the bonnet 27 and the cage spacer 25. The gaskets 28, 29 will prevent fluid leakage between the cage spacer 25, valve body 11 and the bonnet 27. The above-described mounting arrangement for the valve seat ring 15, trim cage 19, and cage spacer 25 securely mounts these components within the web portion 13 of the valve body 11 and between the annular recess 16 of the web portion 13 and the valve bonnet 27. Moreover, a continuous, open fluid space is defined by the fluid inlet 12, the flow path 18 of the valve seat ring 15, the flow path 22 of the trim cage 19 and the hollow interior of the cage spacer 25. Any fluid flow entering the valve body 11 through the inlet 12 will flow freely into the flow path 22 and out the several radial flow paths 23 into the web portion 13. Thereafter, fluid flow will continue to the valve outlet 14. The radial flow paths 23 of the trim cage 19 will act as a partial restriction to fluid flow, as discussed above, to thereby throttle and controllably disipate the kinetic energy of the high pressure flow through the valve body 11.

Pursuant to an important feature of the invention, the valve seat ring 15 is arranged to define a "hard" valve seat and to provide a mounting for a "soft" valve seat, which is spaced in the downstream direction from the "hard" seat. To that end, the diameter of the straight-walled portion of the flow path 18 is somewhat smaller than the diameter of the flow path 22 of the trim cage 19 to define an inwardly extending exposed surface 30. The innermost edge 31 of the surface 30 is contiguous with a downwardly, inwardly tapered surface of finite length which defines a valve seat 32. To advantage, the valve seat ring 15 may be manufactured from hardened stainless steel stock material whereby the valve seat 32 will comprise a "hard" erosion resistant surface. Somewhat downstream from the "hard" valve seat 32 is formed an annular, seat-insert-receiving recess 33. The width and position of the recess 33 are such that the trim 19 partially overlies the recess 33.

In accordance with the invention, an annular insert 34 is received in the recess 33 to define the "soft" seat. The seat insert 34 may be made from DuPont "Vespel", which is a high-temperature (500° F. to 900°) polymide plastic suitable for repeated compression and relaxation, as required in a soft valve seat design. As indicated above, the cage trim 19 partially overlies the recess 33 to thereby retain the seat insert 34 within the recess 33. In this manner, the valve seat ring 15 and trim cage 19 provide two, spaced valve seats 32, 34, each of which is exposed for mating with a suitable valve plug to interrupt fluid flow through the valve body 11, as will be fully described below. The upstream valve seat 32 is made from hardened, erosion resistant stainless steel and is therefore suitable for forming a primary throttling area for the high pressure fluid flow, particularly during the time immediately before either initial valve opening or valve closing. The downstream valve seat 34 comprises a deformable, resilient material and will therefore accommodate a fully conformed mating between the seat 34 and a complementary valve plug to provide a zero-leakage shut off.

Pursuant to another important feature of the invention, a novel valve plug means 35 is slideably received within the open space formed by the flow passage 22 of the trim cage 19 and the hollow interior of the cage spacer 25. The valve plug means 35 comprises a main valve plug 36 and an inner, auxiliary throttle plug 37. The valve-bonnet 27 is provided with a central opening 38 through which a valve stem 39 is received. The main valve plug 36 includes an upwardly extending projection 40 which is received within an opening 41 formed at the lowermost portion of the valve stem 39 and secured therein by means of a pin 42. The valve stem 39 is associated with a conventional valve actuator in a well known manner (not specifically illustrated) whereby the valve stem 39 may be selectively, axially displaced to thereby controllably lift and lower the main valve plug 36 through a predetermined valve stroke to open and close the valve 10. The main valve plug 36 is formed to include a lower holow portion 43 to slideably receive the throttle plug 37. The throttle plug 37 is axially displaceable relative to the main valve plug 36, within the hollow portion 43, through a predetermined limited distance. A metal piston ring 57 is secured about the throttle plug 37 to minimize fluid leakage between the throttle plug 37 and the main plug 36. The portion of the main valve plug 36 circumscribing the lowermost end of the hollow, internal portion 43 is provided with a downwardly extending, circumferential rib element 44 which is vertically aligned with the soft seat-insert 34. Accordingly, when the valve stem 39 is operated to lower the main valve plug 36 to its lowermost position, as illustrated in FIG. 3, the rib portion 44 will be pressed against the deformable, resilient seat insert 34 to form a fully conformed leak-tight seal therebetween. Moreover, when the main valve plug 36 is in the above described closed position, the main valve plug 36 will completely block off the radial fluid flow paths 23 of the trim cage 19 to interrupt fluid flow through the valve body 11. A U-shaped cup seal 45 is mounted within the recess 26 to prevent fluid leakage between the main plug 36, cage spacer 25 and trim cage 19.

Figure 2:
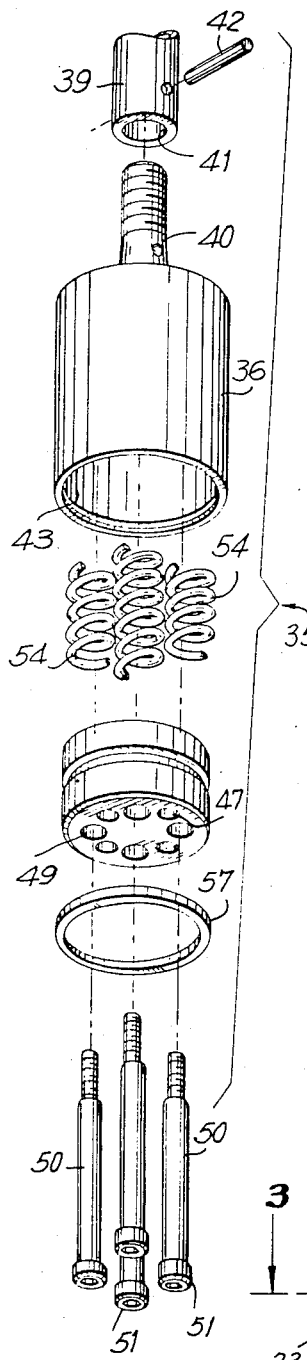
FIG. 2 is an exploded, perspective view of the valve plug means of the present invention.
Figure 1:
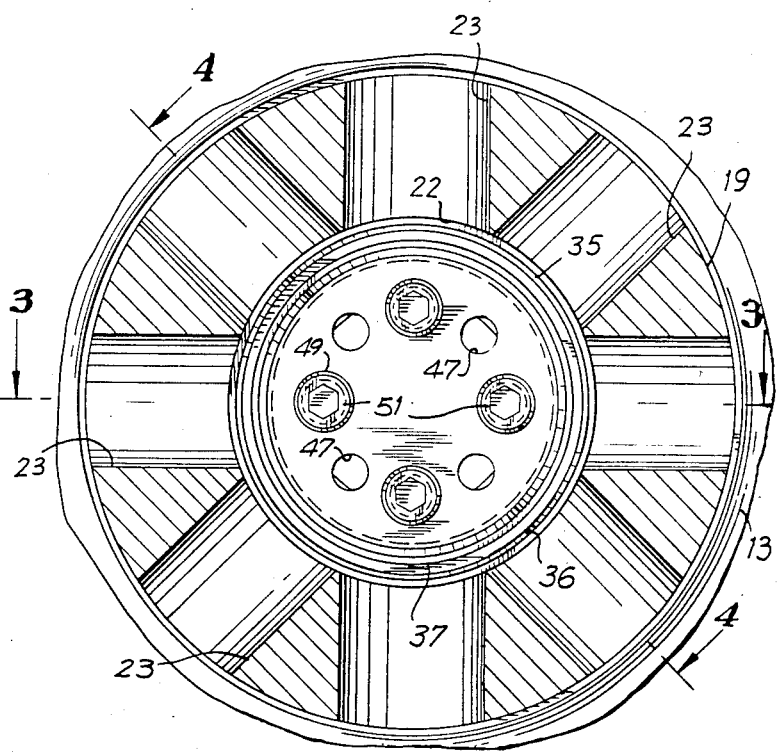
FIG. 1 is a bottom plan view of the valve plug means of the present invention as shown within a fluid flow restrictor illustrated in cross-section.
Figure 4:
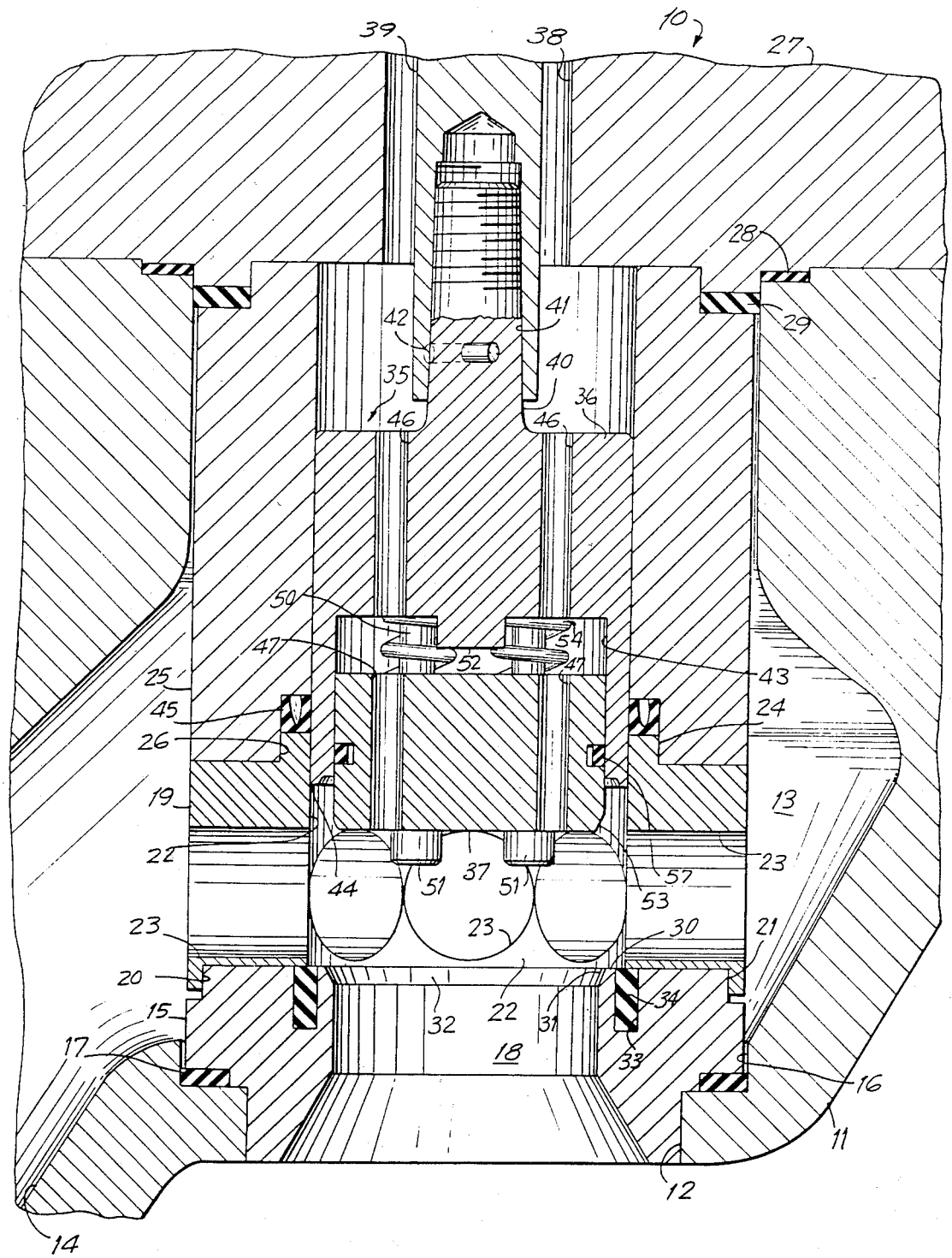
FIG. 4 is a side cross-sectional view of the control valve of FIG. 3 illustrating the valve in the fully opened position and taken generally along line 4—4 of FIG. 1.

To advantage, a series of flow openings 46, 47 is formed through each of the main plug 36 and throttle plug 37, respectively to allow fluid to flow above the valve plug means 35 and into the hollow interior of the cage spacer 25 (see FIGS. 1, 4). In this manner, the pressure effects above and below the valve plug 35 will tend to substantially balance each other out to reduce the stem forces necessary to move the valve plug 35. Moreover, due to the somewhat smaller diameter of the passage 18 relative to the flow path 22, the fluid pressures acting upon the valve plug 35 will be slightly unbalanced in the downward direction thereby tending to urge the valve plug 35 toward the closed valve position.

An additional series of threaded openings 48 is formed through the main plug 36 (see FIG. 3). The threaded openings 48 are each axially aligned with a complementary opening 49 formed through the throttle plug 37. A series of bolts 50 are each received through one of the openings 49 and are threadedly engaged within the threaded opening 48 aligned with the particular opening 49 to provide a means for retaining the throttle plug 37 within the hollow portion 43 of the main plug 36. The bolts 50 each extend well beyond the rim 44 and include an end portion of enlarged diameter 51. More specifically, each end portion 51 has a diameter which is somewhat larger than the internal diameter of the complementary throttle plug opening 49 such that the throttle plug 37 will bottom against the end portions 51, as will appear. Moreover, a centrally disposed, downwardly extending hub element 52 is formed within the hollow portion 43 of the main plug 36 to form an upper stop for the throttle plug 37. In this manner, the throttle plug 37 is axially movable, relative to the main plug, between the hub element 52 and the end portions 51 of the bolts 50.

Pursuant to the invention, the distance between the hub portion 52 and the bolt end portions 51 is arranged to be greater than the length of the throttle plug 37 and these elements are fixed relative to one another whereby the throttle plug 37 protrudes from the hollow portion 43 for all axial positions of the throttle plug 37 between the hub 53 and the bolt end portions 51, as clearly illustrated in FIGS. 3 and 4. The lowermost, protruding end of the throttle plug 37 is formed to an inwardly tapered, valve seat engaging surface 53 which is aligned and matable with the hard valve seat 32. As should be understood, the protruding valve seat engaging surface 53 and the rib portion 44 provide the valve plug means for engaging the above-described, spaced hard valve seat 32 and soft valve seat 34. The spatial relation between the seat engaging elements 53, 44 and the seats 32, 34, as well as the relative movement permitted between the main and throttle plugs 36, 37 is such that the rib 44—soft seat 34 engagement will occur after the surface 53—valve seat 32 engagement in a valve closing operation and disengagement will occur before surface 53—valve seat 32 disengagement in a valve opening operation. As will be described more fully in the following description of the operation of the valve, the sequence of seat engagement and disengagement brought about by the main plug-throttle plug and spaced hard seat-soft seat arrangement of the invention will act to displace the primary throttling area for the fluid flow during valve opening and closing operations away from the soft valve seat insert 34.

In order to facilitate a near leak-tight seal between the surface 53 and the hard valve seat 32 during valve closing and opening operations, a set of coil springs 54 is arranged between the main plug 36 and throttle plug 37. Each spring 54 is coaxial with one of the bolts 50 and acts between a first recess 55 formed within the hollow portion 43 of the main plug 36 and a second recess 56 formed in the upper portion of the throttle plug 37. The springs 54 will tend to urge the throttle plug 37 away from the hub 52 and in a valve seat engaging direction.

Referring now to FIG. 3, when the valve plug 35 is in the closed position, the closing force developed by the valve stem 39 will be transmitted directly through the main valve plug 36 to the rib 44 to form the fully conformed, leak-tight seal between the rib 44 and the soft seat insert 34, as discussed above. Moreover, the valve seat engaging surface 53 of the throttle plug 37 will be in a mating relation with the hard seat surface 32. The central hub 52 is arranged to contact the throttle plug 37 when the valve plug 35 is in the closed position whereby the forces developed by the valve stem 39 will also be transmitted through the main valve plug 36, hub 52, and throttle plug 37 to the hard valve seat 32 to form a near leak-tight seal between the surface 53 and hard valve seat 32. When the valve is to be opened, the valve stem 39 will be moved upwardly to thereby lift the main valve plug 36 and displace the rib 44 from the soft seat insert 34. During the upward movement of the main valve plug 36, both the springs 54 and the slightly unbalanced pressure effects discussed above will tend to maintain the throttle plug 37 in contact with the hard valve seat 32. At this time, the only fluid flow will be a minimal amount of leakage between the surface 53 and hard valve seat 32 and around the metal piston ring 57. It should be understood that all of such fluid leakage will be primarily throttled across the hard, erosion resistant metal seat 32 and metal piston ring 57.

Upon continued upward movement of the main valve plug 36, the throttle plug 37 remains in contact with the hard valve seat 32 until the throttle plug 37 bottoms against the portions 51 of the bolts 50. In the preferred embodiment, the plug 37 bottoms against the portions 51 when the main plug has exposed approximately 50% of the paths 23. Thereafter, further continued upward movement of the main valve plug 36 will cause the bolts 50 to lift the throttle plug 37 away from the hard metal seat 32. At this point, the rib 44 will have been displaced a significant distance from the soft seat insert 34 and the tapered surface 53 will be spaced a minimal distance from the hard valve seat 32 whereby fluid flow may begin to flow from the flow path 18 into the fluid path 22 and through the radial flow paths 23. In such an arrangement, the initial fluid flow will be throttled primarily across the hard, erosion resistant metal seat 32 and thereafter further throttled by the radial flow paths 23 of the trim cage 19. Thus, there will be a minimal amount of erosive fluid forces acting upon the soft valve seat insert 34 which is, at this point, spaced a significant distance from the rib 44, relative to the spacing between the surface 53 and the hard metal seat 32 and, therefore, does not define a principal throttling area for fluid flow particularly in view of the primary throttling area formed between the surface 53 and hard metal seat 32. Further continued upward movement of the main valve plug 36 will act to progressively expose more and more of each of the radial flow paths to fluid flow until the paths 23 are fully exposed to fluid flow. At this time, the radial flow paths 23 will form the primary throttling areas for the high pressure fluid flow through the valve body 11.

During a valve closing operation, the valve stem 39 will lower the valve plug 35 whereby the main valve plug 36 will begin to close the radial flow paths 23 to fluid flow and the surface 53 approaches and eventually contacts the hard metal valve seat 32. As the surface 53 approaches the hard metal valve seat 32, the fluid flow will again be primarily throttled in the increasingly smaller and smaller space between the surface 53 and hard valve seat 32. At the point where the surface 53 contacts the hard metal seat 32 to substantially close off fluid flow through the valve, the rib 44 will still be spaced a significant distance from the soft seat insert 34, as in the corresponding position of the valve plug 35 during a valve opening operation, and, therefore, will again not define a significant throttling area for the fluid flow relative to the throttling area defined by the surface 53 and hard vavle seat 32. Once again, the fluid flow is substantially interrupted by the mating engagement between the surface 53 and hard valve seat 53. At this time, there will be a minimal amount of fluid leakage, throttled primarily over the hard valve seat 32 and metal piston ring 57. To fully close the valve, the valve stem 39 will move further downward to continue to lower the main valve plug 36 until the rib 44 engages the soft seat insert 34. During this time, the throttle plug will move relative to the main valve plug 36 within the hollow portion 43 until the throttle plug 37 once again engages the hub 52 whereupon further additional forces developed through the valve stem 39 will once again act to form a fully conformed, zero-leakage seal between the rib 44 and the soft seat insert 34 and a near zero-leakage seal between the surface 53 and hard metal seal 32.

Thus, the present invention provides a highly effective valve structure operable to provide a complete isolation of high pressure fluid from the valve outlet when the valve is in the closed position and to achieve a fluid flow through the valve body in a manner whereby there is a minimal amount of erosive effects by the high pressure fluid flow in the area of the soft valve seat. The highly advantageous valve operation is achieved through a unique arrangement of a double hard seat-soft seat as well as a double main valve plug, throttle plug configuration wherein the geometry between these components and a relative motion permitted between the main plug and throttle plug provide valve opening and closing operations which tend to isolate the deleterious effects of the fluid flow to hard, erosion resistant surfaces which are remote from the soft seat forming portion of the valve structure. Accordingly, the valve of the present invention may be operated through repeated valve opening and valve closing operations while forming a zero-leakage valve shut off at each valve closing and while operating in a manner to greatly extend the worklife of the material forming the soft valve seat.

Figure 5:
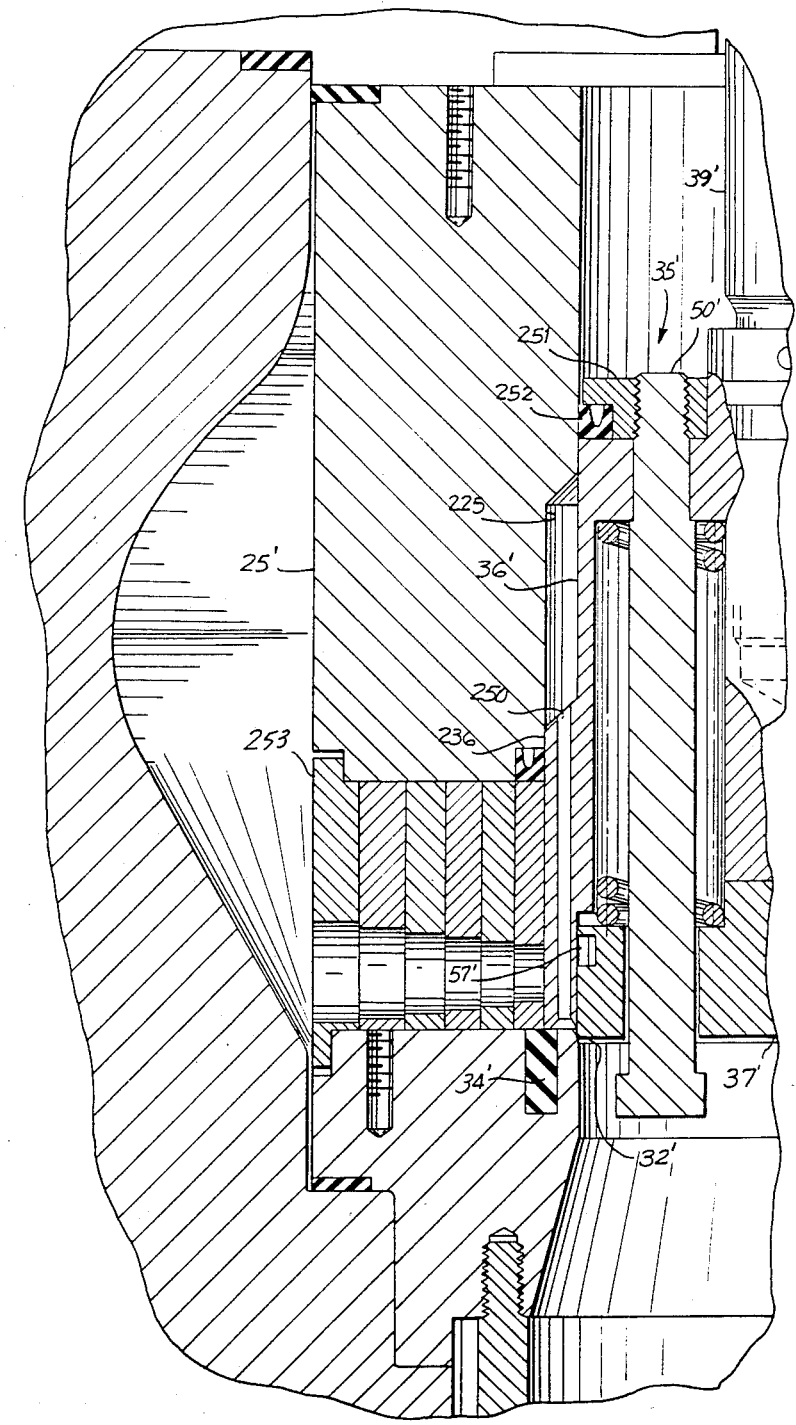
FIG. 5 is a partial side cross-sectional view of a modified version of the valve of FIG. 3.

FIG. 5 is a partial cross-sectional view of a modified version of the valve of FIG. 3. As illustrated, the main valve plug 36′ includes a portion of increased diameter 236 arranged to be slideably received within a generally cylindrical recess 225 formed within the hollow interior of the spacer 25′. A series of fluid flow paths 250 are formed through the portion of increased diameter 236 of the main valve plug 36′. In addition, the diameter of the main valve plug 36′ above the portion 236 is substantially equal to the diameter of the throttle plug 37′. The modified structure of the valve plug 36′, as illustrated in FIG. 5, as well as the additional fluid flow paths 250, provide a highly advantageous balancing means whereby the valve plug 35′ may be axially displaced by the valve stem 39′ in a smooth valve opening and valve closing operation. More specifically, when the valve is in the closed position, the inlet fluid pressure which leaks passed the piston ring 57′ or the valve seat 32′ will leak through the flow path 250 to the portions of the cylindrical recess 225 above the portion 236 of the main valve plug 36′. In addition, the high inlet pressure fluid may also flow through a series of openings similar to the openings 46, 47 of the valve of FIG. 3 to above the valve plug 35′. In this manner, the valve plug 35′ will be substantially balanced when in the closed position. During a valve opening operation, the main plug 36′ will lift from the soft valve seat 34′ and the fluid pressure acting both above and below the portion 236 will decrease to the outlet pressure. However, the inlet pressure acting upon the valve plug 35′ will remain substantially balanced inasmuch as the upper diameter of the main valve plug 36′ is substantially equal to the diameter of the throttle plug 37′ exposed to high pressure inlet fluid. The above described configuration for the main valve plug 36′ eliminates any possible unbalanced pressure reversals which may occur due to changes in the exposure of each of the main valve plug 36 and throttle plug 37 (see FIG. 3) to high pressure inlet fluid during a valve opening and valve closing operation. In all other respects, the valve of FIG. 5 is identical to the valve of FIG. 3.

In order to prevent fluid leakage from the hollow interior of the cage spacer 25′ and around the upper portion of the main valve plug 36′, a generally annular cap member 251 is threadedly secured to the upper portion of the main valve plug 36′ by the bolts 50′ and mount a U-cup sealing member 252 in a sealing relation between the hollow interior of the cage spacer 25′ exposed to high pressure fluid and the outer surface of the upper portion of the main valve plug 36′. Moreover, to advantage, the fluid flow restrictor 253 comprises a restrictor of the type disclosed in U.S. Pat. No. 4,249,574, the disclosure of which is expressly incorporated herein by reference.

The above-described preferred embodiments of the invention are meant to be representative only as certain changes may be made therein by persons skilled in the art without departing from the clear teachings of the invention. Accordingly, reference should be made to the following appended claims in determining the full scope of the invention.

We claim:

1. A high pressure fluid control valve which comprises
   (a) a valve body including an internal flow path defining a fluid inlet and a fluid outlet,
   (b) a first valve seat arranged within said internal flow path,
   (c) a second valve seat arranged within said internal flow path in a spaced relation to said first valve seat,
   (d) a main valve plug comprising integral upper and lower portions,
   (e) said main valve plug being selectively, axially movable within said internal flow path and matable with said first valve seat to interrupt fluid flow between the fluid inlet and the fluid outlet, and
   (f) a throttle plug axially movable within said internal flow path in a predetermined relative motion with respect to said main valve plug, and matable with said second valve seat to interrupt fluid flow between the fluid inlet and the fluid outlet,
   (g) at least the lower portion of said main valve plug including a bore formed therein,
   (h) said throttle plug being received in said bore whereby said throttle plug is in a coaxial, telescoping relation with said main valve plug,
   (i) said throttle plug being movable relative to said main valve plug within said bore through said predetermined limited distance, whereby during a valve opening operation said main valve plug lifts from said first valve seat before said throttle plug lifts from said second valve seat, thereby throttling initial fluid flow primarily across said second valve seat,
   (j) said lower portion of the main valve plug having an outer diameter that is greater than the outer diameter of said upper portion of the main valve plug,
   (k) the outer diameter of the upper portion of said main valve plug being substantially equal to the outer diameter of said throttle plug,
   (l) at least one fluid flow path being formed completely through said lower portion of the main valve plug whereby fluid may flow from below to above said lower portion of the main valve plug,
   (m) at least one flow path being formed completely through the throttle plug and the upper portion of said main valve plug whereby fluid may flow from below the throttle plug to above the upper portion of the main valve plug,
   (n) the portions of said internal flow path above the upper portion of the main valve plug being isolated from the portions of said internal flow path which overlie the larger outer diameter lower portion of the valve plug,
   (o) whereby fluid leakage across the main valve plug and through the flow path formed through the lower portion of the valve plug will flow to a portion of the internal flow path of the valve body which is isolated from the portions of the internal flow path above the upper portion of the main valve plug, thereby eliminating any unbalanced pressure reversals which may occur due to changes in the exposure of each of the main valve plug and throttle plug to high pressure inlet fluid during a valve opening operation.

2. The high pressure fluid control valve according to claim 1, further characterized by
 (a) said first valve seat comprising a deformable resilient material, and
 (b) said second valve seat comprising a hardened erosion-resistant material.

* * * * *